May 8, 1928.
N. E. METHLIN
1,668,862
APPARATUS FOR THE CONTROL OF FIRING AGAINST AERIAL TARGETS
Filed Oct. 25, 1926
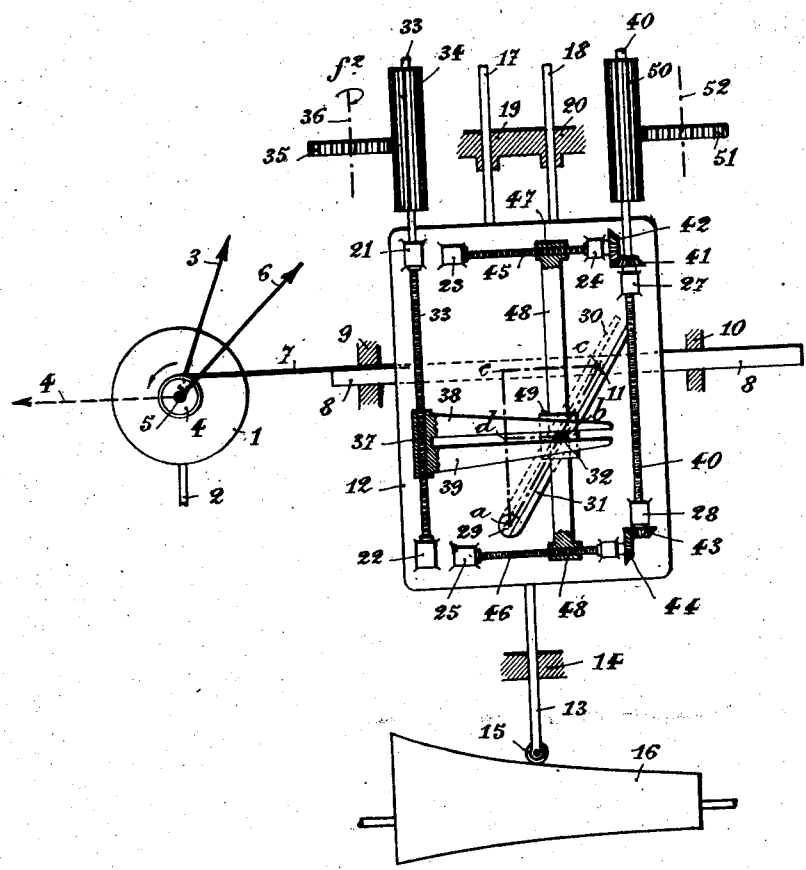

Patented May 8, 1928.

1,668,862

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT-STOCK COMPANY.

APPARATUS FOR THE CONTROL OF FIRING AGAINST AERIAL TARGETS.

Application filed October 25, 1926, Serial No. 144,065, and in France August 12, 1926.

This invention relates to improvements in or modifications of the invention claimed in U. S. Patent No. 1,576,367.

The present invention relates to a modification in the devices described in the said prior specification and employed for obtaining the products of factors which occur in the formulæ giving the kinetic corrections $\delta$ and $\sigma$.

The new principle put into operation consists in making use of a tachometer (of any type, electromagnetic, mechanical or other) for measuring the angular velocities $$\frac{d\omega}{dt} \text{ or } \frac{d\alpha}{dt}$$

of the target, then in recopying these velocities by means of a device comprising a pointer controlled by a handle by means of a double transmission of displacements enabling the angular velocity to be multiplied first by the predicted duration of travel $f_2$, then by the factor of correction mentioned in the prior Patent No. 1,576,367:

$$\tan \frac{(\alpha_0+\sigma)}{\tan \alpha_0} \text{ or } \sin \frac{(\alpha_0+\sigma)}{\sin \alpha_0}$$

The double transmission of displacements which enables the product of three factors to be obtained may for example be effected by the application of the principle employed in U. S. Patent No. 1,345,697.

This principle comprises the use of the known properties of similar triangles for obtaining a product of two factors such as the duration of travel $f_2$ and the angular azimuthal velocity $$\frac{d\omega}{dt} \text{ or zenithal velocity } \frac{d\alpha}{dt}.$$

According to the present invention, this same principle is employed in a novel and judicious manner for directly obtaining the products of three factors $$f_2 \frac{\tan (\alpha_0+\sigma)}{\tan \alpha_0} \frac{d\omega}{dt} \text{ and } f_2 \frac{\sin (\alpha_0+\sigma)}{\sin \alpha_0} \frac{d\alpha}{dt}$$

which enter into the expressions which enable $\delta$ and $\sigma$ to be calculated.

In the accompanying drawing the figure shows by way of example the arrangement of a device for determining the kinetic correction in direction $\delta$, which as stated in U. S. Patent No. 1,576,367 is expressed as follows (in one of the two equations with two unknowns which serve for determining $\delta$ and $\sigma$).

$$\delta = f_2 \frac{\tan (\alpha_0+\sigma)}{\tan \alpha_0} \frac{d\omega}{dt}$$

in which $f_2$ is the predicted duration of travel of the projectile, $\alpha_0$ the present site, $\alpha_0+\sigma$ the predicted site and $$\frac{\delta\omega}{dt}$$

the azimuthal angular velocity of the target.

In the figure, 1 is a tachometer employed for measuring the azimuthal angular velocity. This tachometer may be of any type. However in the example considered it has been assumed that the tachometer employed indicates both the direction and the magnitude of the angular velocity. 2 is the shaft controlling the tachometer, which shaft is driven by the direction member at a speed proportional to $$\frac{\delta\omega}{dt}$$

as previously explained in the said Patent No. 1,576,367. 3 is the pointer of the tachometer the angular displacement of which from the initial position shown in dotted lines is proportional to $$\frac{\delta\omega}{dt};$$

4 is a cylinder, the spindle 5 of which is mounted in alignment with the axis of the tachometer 1; 6 is a pointer mounted upon the cylinder 4; 7 is a steel strip attached at one end to the cylinder 4 and at the other to an adjusting bar 8 which is adapted to slide in fixed slideways 9 and 10; 11 is a pin attached to the adjusting bar 8; 12 a supporting plate which is adapted to be displaced vertically and which has been assumed to be placed in front of the adjusting bar 8; 13 is a vertical rod rigidly secured to 12, which passes through a fixed slideway 14 and terminates in a roller 15 which the weight of 12 keeps in contact with a camoid 16; 17 and 18 are two vertical guide rods rigidly secured to 12 which pass through fixed slideways 19 and 20; 21, 22, 23, 24, 25, 26, 27 and 28 are bearings mounted upon the common support 12; 29 is a shaft which passes through 12; 30 is a lever (shown in dotted lines because it is located behind 12) mounted upon 29, upon which lever abuts the pin 11 which is constantly acted upon by the cylinder 4 in such a way as to tend to make it move towards the left. 31 is a lever mounted upon 29 in front of 12, which lever abuts against a pin 32 guided in the manner described hereinafter.

The levers 30 and 31 must be mounted in such a way that the edges upon which the pins 11 and 32 press are strictly parallel and in addition the distances from these edges to the centre of 29 must be respectively equal to the radii of the pins 11 and 32. 33 is a shaft supported by 21 and 22 and is screw-threaded over the part comprised between 21 and 22. 34 is a long pinion mounted upon 33 and remains in engagement whatever be the displacements of 12 in a vertical direction, with a pinion 35 mounted upon a shaft 36 which is given movements of rotation proportional to the predicted duration of travel $f_2$ which is still determined as described in U. S. Patent No. 1,576,367. 37 is a nut mounted upon the screw-threaded part of 33 and provided with two angle brackets 38 and 39 guiding the pin 32 in such a way that its distance to the horizontal line passing through the centre of 29 is proportional to the predicted duration of travel $f_2$. 40 is a shaft supported by 27 and 28 and drives through the pinions 41, 42, 43 and 44 the two screw-threaded shafts 45 and 46 carried respectively in bearings 23 and 24 and by bearings 25 and 26. 47 and 48 are two nuts mounted respectively upon 45 and 46 and are connected by a vertical adjusting bar 48. 49 is a slide block mounted upon 48 to which slide block is attached the pin 32. 50 is a long pinion mounted upon 40 which pinion remains in engagement whatever be the displacements of 12 in the vertical direction, with a pinion 51 mounted upon a shaft 52. The operator whose duty it is to work out $\delta$ acts upon this shaft 52 and for this purpose his work consists in keeping the pointer 6 in coincidence with the pointer 3.

In order to explain the operation of the mechanism hereinbefore described, let $a$—$b$ be the distance between the centres of 29 and of 32, $a$—$c$ the distance between the centres of 29 and 11 and $a$—$d$ and $a$—$e$ the projections of $a$—$b$ and $a$—$c$ onto the vertical line passing through $a$.

The mechanism must be adjusted in such a way that when $c$ is brought to $e$ the pointer 6 coincides with the position which the pointer of the tachometer occupies when $$\frac{d\omega}{dt} = 0.$$

If the pointer 6 is kept in coincidence with the pointer 3, the length $e$—$c$ will then be proportional to $$\frac{d\omega}{dt}$$

so that we have $$ec = K_1 \frac{d\omega}{dt}.$$

The length $a$—$e$ must moreover be at each instant proportional to the value of $$\frac{\tan \alpha_0}{\tan (\alpha_0 + \sigma)}$$

so that we have $$ae = K_2 \frac{\tan \alpha_0}{\tan (\alpha_0 + \sigma)}.$$

This result is obtained by suitably adjusting the position of the camoid 16 which turns as a function of $\alpha$ and is displaced longitudinally as a function of $\sigma$.

As has been already explained $ad$ is always proportional to $f_2$ so that we have $ad = K_3 f_2$.

These equations having been established, by considering the two similar triangles $a$—$b$—$d$ and $a$—$c$—$e$ we have:

$$\frac{db}{ad} = \frac{ec}{ae}$$

from which we obtain $$db = ad \frac{ec}{ae}$$

and by substituting for $ad$, $ec$ and $ae$ their values we obtain:

$$db = \frac{K_1 K_3}{K_2} f_2 \frac{\tan (\alpha_0 + \sigma)}{\tan \alpha_0} \frac{d\omega}{dt}$$

It is thus seen that $db$ is proportional to the kinetic correction in direction $\delta$; and it will obviously be the same with the number of revolutions through which the shaft 52 must be made to turn (starting from the position in which $b$ coincides with $d$) in order to bring 6 on to 3.

This shaft 52 will therefore be able to control through gear trains all the members into which the kinetic correction in direction $\delta$ must be introduced as has been already described in U. S. Patent No. 1,576,367.

In order that the attendants will not be able to put the parts of the mechanism out of adjustment at the end of the movements of the levers 30 and 31, it will be necessary to interpose effort limiting means between the handles which serve for determining $f_2$ and $\delta$ and the shafts 36 and 52 which these handles control. For the same purpose provision may also be made of an automatic locking device for these shafts, operating a little before the levers 30 and 31 reach the end of their stroke.

The device for working out the correction $\sigma$ will be entirely similar as regards the first term.

Having now particularly described and ascertained the nature of my invention and in what manner the same is to be performed, I declare that what I claim is:—

1. In apparatus for the determination of kinetic corrections in elevation and direction to be applied in the firing of anti-aircraft guns, the combination of a vertically adjustable plate, an arm pivoted thereon, a horizontally adjustable slide, a pin on said slide engaging said arm, a second pin engaging said arm, and means for adjusting said second pin horizontally relative to said plate.

2. Apparatus for the determination of ballistic corrections involving the product of a plurality of factors comprising a vertically adjustably plate, an arm pivoted thereon, a horizontally adjustable slide, a pin on said slide engaging said arm, a second pin engaging said arm, and means for adjusting said second pin horizontally relative to said plate, said second pin and adjusting means being carried by said plate.

3. Ordnance apparatus for the determination of kinetic corrections in elevation and direction comprising a vertically adjustable plate, an arm pivoted thereon, a horizontally adjustable slide, a pin on said slide engaging said arm, a second pin engaging said arm, and means carried by said plate for adjusting said second pin horizontally.

4. Ordnance apparatus for the determination of ballistic corrections in elevation and direction comprising a supporting member movable in one direction, an arm pivoted on said member, means movable in a direction at right angles to said first named direction and engaging said arm, a second movable means engaging said arm, and actuating means for moving said second means in either of said directions.

5. Apparatus of the class described comprising a sliding plate, an arm pivoted thereon, a member slidable in a direction at right angles to the direction of motion of said plate, means operatively connecting said arm with said member, a member engaging said arm, and independent means for moving said last named member in directions parallel to the motions of said plate and of said slidable member whereby said arm is rotated to displace said slidable member.

6. Ordnance apparatus for determining the product of a plurality of factors and based on the principle of similar triangles comprising an arm constituting the hypotenuse of a right triangle, means pivotally connected to each end of said arm and slidably crossing each other at right angles to constitute the legs of said triangle, said arm being supported by one of said means and bodily movable therewith to vary the length of one leg proportionally to one factor, a member engaging said arm and movable in directions parallel to either of said legs, said member with said arm and its supporting means constituting a second triangle similar to said first triangle, the movement of said member in a direction parallel to the movement of the supporting means varying the corresponding leg of the second triangle proportionally to a second factor, and means moving said member in a direction at right angles to said last named direction thereby rotating said arm about its pivot and varying the other two corresponding legs of said triangles simultaneously, the length of one of said last two legs being maintained proportional to a third factor by the motion of said last named means whereby said motion is proportional to the product of said three factors.

7. Ordnance apparatus for the determination of ballistic corrections by the mechanical solution of similar triangles comprising a pivoted arm bodily movable in one direction, means movable in a direction at right angles to said first direction by rotation of said arm, visual indicating means for regulating the extent of motion of said movable means, and means engaging said arm to rotate the same in accordance with said indicating means.

8. Ordnance apparatus for the determination of ballistic corrections based on the principle of similar triangles comprising a pivoted arm movable bodily in one direction, means moving said arm in said direction proportionally to one factor, rotating means engaging said arm, means moving said rotating means along said arm proportionally to another factor, and visual indicating means for determining the extent of rotation of said arm proportionally to a third factor whereby motion of said rotating means with said arm is proportional to the product of said factors.

9. Ordnance apparatus of the class described comprising a pivoted arm movable bodily in one direction, camoid means moving said arm in said direction, rotating means moving at right angles to said direction and engaging said arm, means shifting said rotating means parallel to said direction to vary the point of engagement with said arm, pointer means displaced by rotation of said arm, and a visual indicator determining the proper position of said pointer, whereby motion of said rotating means to maintain said pointer in the indicated position is proportional to the product of factors introduced by said camoid means, shifting means, and visual indicator.

In testimony whereof I have signed this specification.

NICOLAS EMILIEN METHLIN.